US012607049B2

(12) United States Patent
Vayssiere et al.

(10) Patent No.: US 12,607,049 B2
(45) Date of Patent: Apr. 21, 2026

(54) DOOR LOCKING ASSEMBLY FOR AN AIRCRAFT

(71) Applicants: AIRBUS HELICOPTERS DEUTSCHLAND GMBH, Donauworth (DE); AIRBUS HELICOPTERS, Marignane Cedex (FR)

(72) Inventors: Aurelien Vayssiere, Niederschoenenfeld Gt Feldheim (DE); Aurelien Renard, Ensues la Redonne (FR); Pierre Fruitet, Pompignan (FR); Bernhard Rein, Rain am Lech (DE)

(73) Assignees: AIRBUS HELICOPTERS DEUTSCHLAND GMBH, Donauwörth (DE); AIRBUS HELICOPTERS, Marignane Cedex (FR)

( * ) Notice: Subject to any disclaimer, the term of this patent is extended or adjusted under 35 U.S.C. 154(b) by 134 days.

(21) Appl. No.: 18/121,050

(22) Filed: Mar. 14, 2023

(65) Prior Publication Data

US 2024/0003171 A1 Jan. 4, 2024

(30) Foreign Application Priority Data

Jun. 30, 2022 (EP) .................................... 22400005

(51) Int. Cl.
*E05C 3/04* (2006.01)
*E05C 3/00* (2006.01)
(Continued)

(52) U.S. Cl.
CPC .............. *E05C 3/045* (2013.01); *E05C 3/004* (2013.01); *B64C 1/1438* (2013.01); *B64C 27/04* (2013.01)

(58) Field of Classification Search
CPC ....... E05C 3/045; E05C 3/004; B64C 1/1438; B64C 27/04
See application file for complete search history.

(56) References Cited

U.S. PATENT DOCUMENTS

| | | | | | |
|---|---|---|---|---|---|
| 11,002,046 | B2 * | 5/2021 | Kim | ........................ | E05B 63/06 |
| 2003/0146643 | A1 | 8/2003 | Dietl | | |

(Continued)

FOREIGN PATENT DOCUMENTS

| | | |
|---|---|---|
| CN | 102140873 A | 8/2011 |
| CN | 104309799 A | 1/2015 |

(Continued)

OTHER PUBLICATIONS

European Search Report for European Application No. EP 22400005. 9, Completed by the European Patent Office, Dated Dec. 6, 5 pages.

(Continued)

*Primary Examiner* — Mark A Williams
(74) *Attorney, Agent, or Firm* — BROOKS KUSHMAN P.C.

(57) ABSTRACT

The disclosure relates to a door locking assembly for locking a door of an aircraft, comprising a locking hook adapted for blocking in a locking position a lockable arm of a door of an aircraft; a release lever connected to the locking hook for moving the locking hook from a releasing position into the locking position in response to being actuated by a lockable arm of a door of an aircraft; an operating handle connected at least to the release lever and rotatable for moving the locking hook from the locking position to the releasing position; and a locking indicator connected to the locking hook for indicating positioning of the locking hook in one of the locking position or the releasing position.

20 Claims, 4 Drawing Sheets

(51) Int. Cl.
    *B64C 1/14*                (2006.01)
    *B64C 27/04*           (2006.01)

(56) References Cited

U.S. PATENT DOCUMENTS

| | | | |
|---|---|---|---|
| 2010/0064740 A1* | 3/2010 | Koppel | E05B 83/16 |
| | | | 70/91 |
| 2011/0101710 A1* | 5/2011 | Elbrecht | E05C 3/048 |
| | | | 292/202 |
| 2011/0174929 A1 | 7/2011 | Rowbut et al. | |
| 2011/0227350 A1* | 9/2011 | Do | E05C 19/145 |
| | | | 292/105 |
| 2012/0102842 A1* | 5/2012 | Fournie | E05C 19/145 |
| | | | 292/200 |
| 2012/0235425 A1* | 9/2012 | Do | E05C 1/065 |
| | | | 292/150 |
| 2015/0159403 A1 | 6/2015 | Portegies | |
| 2015/0300061 A1* | 10/2015 | Fabre | F02C 7/20 |
| | | | 292/113 |

| | | | |
|---|---|---|---|
| 2018/0195325 A1* | 7/2018 | Amante | B64C 27/04 |
| 2019/0017304 A1* | 1/2019 | Bellavia | E05B 15/101 |
| 2019/0383068 A1 | 12/2019 | Konrad | |

FOREIGN PATENT DOCUMENTS

| | | | |
|---|---|---|---|
| CN | 114109195 A | 3/2022 | |
| EP | 2872395 B1 | 10/2016 | |
| EP | 3571365 B1 | 7/2020 | |
| EP | 3825226 A1 | 5/2021 | |
| EP | 3922546 A1 | 12/2021 | |
| JP | 2008255566 A | 10/2008 | |
| NL | 2009218 C2 | 1/2014 | |
| WO | 2014011130 A2 | 1/2014 | |
| WO | 2014011130 A3 | 3/2014 | |

OTHER PUBLICATIONS

First Office Action for Chinese Application No. 202310266958.4, Completed by the Chinese Intellectual Property Administration, dated Dec. 1, 2025, 15 pages (including machine translation).

\* cited by examiner

DOOR LOCKING ASSEMBLY FOR AN AIRCRAFT

CROSS-REFERENCE TO RELATED APPLICATIONS

This application claims priority to European patent application No. EP 22400005.9 filed Jun. 30, 2022, the disclosure of which is incorporated in its entirety by reference herein.

TECHNICAL FIELD

The present disclosure is related to a door locking assembly for locking a door of an aircraft. The present disclosure is further related to an aircraft comprising such a door locking assembly.

BACKGROUND

Aircrafts are usually provided with respective aircraft doors to enable crew members and/or passengers an easy access to the aircrafts. The respective aircraft doors are generally embodied as hinged doors, but other types of doors may also be used dependent on a given type of aircraft. For instance, in a rotary-wing aircraft such as a helicopter sliding doors may be used to open or close corresponding apertures provided in the rotary-wing aircraft. Such sliding doors are usually guided on the rotary-wing aircraft via suitable guide rails from an opened position at a predetermined distance along an outer surface of the rotary-wing aircraft up to a height of a corresponding aperture provided in the rotary-wing aircraft, and are then guided into the aperture into a respective closed position via suitably curved or bent ends of the guide rails.

Conventional sliding doors usually comprise one or more sliding arm assemblies that are rigidly mounted to a plate-shaped support of the sliding door via an associated mounting plate by means of suitable fasteners, such as screws. The one or more sliding arm assemblies are e.g., rigidly mounted to a door leaf of the sliding door. Each one of the one or more sliding arm assemblies supports one or more roller carriages with associated guide rollers that are adapted for rolling in operation along a given guide rail. The one or more roller carriages, i.e., the associated guide rollers, are adapted for engaging the given guide rail in an accommodation provided on, or in, the given guide rail. An exemplary sliding door of a rotary-wing aircraft is described in the document EP 3 825 226 A1.

In general, a given sliding door in a rotary-wing aircraft must be moved manually, e.g., starting at a corresponding fully opened position, along the guide rails and must furthermore be locked manually in a corresponding fully closed position in the aperture of the rotary-wing aircraft. Furthermore, it might be required to lock the given sliding door in the corresponding fully opened position in order to prevent the given sliding door from unintentionally and inadvertently moving from the corresponding fully opened position in direction of the corresponding fully closed position, as this may lead to harm and injury e.g., of a respective operator of the given sliding door and/or rotary-wing aircraft passengers. For instance, it might be required to lock the given sliding door in the corresponding fully opened position to enable a safe and reliable hoisting operation. Therefore, it is necessary to provide a suitable door locking assembly for locking and retaining the given sliding door in the corresponding fully opened position upon reaching of the corresponding fully opened position.

The document EP 3 571 365 B1 describes a door locking assembly for locking a door leaf of a sliding door in an aircraft to a door frame. Locking of the door leaf to the door frame is achieved by engaging a catch element with a latching unit, wherein the catch element is designed as an oblong flat part with a latching recess which is engaged by latching bodies of the latching unit for being latched in a latch and lock state of the door locking assembly.

The document EP 2 872 395 B1 describes a door locking assembly for locking a sliding door in an aircraft in a fully opened position. The door locking assembly comprises multiple constituent components, comprising handles, cables, hooks, brackets, and so on.

However, a door locking assembly is generally not only provided to maintain a given sliding door in a respective latch and lock state in its fully opened position, but also to enable a simple and ergonomic unlocking and releasing. Furthermore, such a door locking assembly should be adapted to absorb a respective opening energy generated by the given sliding door upon reaching of the fully opened position and, moreover, have no friction wearing and no noise generation when functioning. In addition, such a door locking assembly should provide an information about its current state, i.e., whether it is in locking or releasing state, and it should be easily and securely installable in a respective rotary-wing aircraft.

Usually, all these different and dissociate functions of the door locking assembly are performed by various different constituent components, so that conventional door locking assemblies are complex and heavy with a comparatively great number of constituent components. However, due to the complexity of the conventional door locking assemblies they usually require a comparatively great installation space. Furthermore, due to the comparatively great number of constituent components, the conventional door locking assemblies are susceptible to failure, which may lead to incidents e.g., in flight operation of a respective rotary-wing aircraft. Moreover, the conventional door locking assemblies are usually difficult to lock/unlock by respective operators, thus, leading potentially to hazardous events. In particular, it is generally not possible to lock/unlock the conventional door locking assemblies with only one hand and suitable ergonomics. WO2014011130, US2003146643, CN114109195 and EP3922546 were cited.

SUMMARY

It is, therefore, an object of the present disclosure to provide a new door locking assembly for locking a sliding door of an aircraft and, more generally, for locking any type of door of any type of vehicle. The new door locking assembly is preferably suitable for locking the door in a fully opened position and enables an increased reliability and safety of the door in locked state.

This object is solved by a door locking assembly having the features of claim 1. More specifically, according to the present disclosure a door locking assembly for locking a door of an aircraft comprises a locking hook adapted for blocking in a locking position a lockable arm of a door of an aircraft; a release lever connected to the locking hook for moving the locking hook from a releasing position into the locking position in response to being actuated by a lockable arm of a door of an aircraft; an operating handle connected at least to the release lever and rotatable for moving the locking hook from the locking position to the releasing position; and a locking indicator connected to the locking hook for indicating positioning of the locking hook in one of the locking position or the releasing position.

Advantageously, the inventive door locking assembly forms a light-weight self-lock and latch system with an integrated unlocking or release lever, visual indication means, and an amortizing or dampening member, and it enables a safe and ergonomic unlocking. More particularly, it has a simple design with a reduced number of constituent components and enables creation of standard equipment parts for any type of door. Thus, any type of door may be designed to have a safe locked state in fully opened position and to be unlocked via a simple unlocking operation which can be performed with only one hand by an operator. The design enables a safe and reliable usage and an easy maintainability and inspection, and it is particularly advantageous for use in aircrafts with sliding doors which must be lockable in fully opened position.

Preferably, the inventive door locking assembly is designed for locking a locker implemented by the lockable arm, which is e.g., installed on the door, i.e., attached to a respective door leaf. The lockable arm may e.g., be provided with a guiding member that implements a failsafe function. The inventive door locking assembly as such may e.g., be mounted to an associated door frame and preferably comprises an integrated lever implemented by the locking hook, the release lever, the operating handle, and the locking indicator, but without any rods or kinematics required in the conventional door locking assemblies. The locking indicator preferably constitutes a direct visual means such as a visual indicator integrated on the door locking assembly. More specifically, the locking indicator forms a flag system that is clearly visible and unambiguously understandable by an operator.

The inventive door locking assembly may further comprise an integrated absorption bumper, in particular an elastomeric bumper, forming a dampening member. Such a dampening member may prevent damage and wearing due to vibration, but it may also be suitable for absorption of energy. Moreover, a pre-catch and catch locking system may be integrated into the door locking assembly. For instance, the pre-catch and catch locking system may comprise a catching notch adapted for catching a lockable arm of a door that performs a locking movement towards the door locking assembly.

Furthermore, two different configurations are possible. More specifically, the door locking assembly may advantageously be installed on an associated door frame, or alternatively on a given door, i.e., door leaf. Likewise, the lockable arm may be mounted either to the given door, i.e., door leaf, if the door locking assembly is installed on the associated door frame, or to the associated door frame, if the door locking assembly is installed on the given door, i.e., door leaf. In both configurations a respectively required installation space is identical, at least within associated manufacturing tolerances, and an adaptation of the door locking assembly and/or the lockable arm is configuration-independent and, therefore, not required.

In summary, the inventive door locking assembly is safe and reliable, has a comparatively low complexity with a reduced number of constituent components, and it is provided with visible indication means. Due to its comparatively low complexity with the reduced number of constituent components respective costs and an associated weight may advantageously be reduced. Furthermore, it may be used on internal and external direct locking means of opening systems, such as doors or cowlings and so on. In particular, it enables a reduction of noise perceived with conventional door locking assemblies during door closure and in flight due to vibration of the rods or kinematics required in such conventional door locking assemblies. Moreover, it enables an easy and ergonomic usage with only one hand of an operator.

According to some aspects, the locking hook is rigidly attached to, or integrally formed with, the release lever.

According to some aspects, the locking hook and the release lever form a plate-shaped lock and release element.

According to some aspects, the plate-shaped lock and release element is rotatably mounted to an associated housing.

According to some aspects, the plate-shaped lock and release element is rotatably mounted to the associated housing via a rotation shaft.

According to some aspects, the locking indicator is rotatably mounted to the associated housing via the rotation shaft.

According to some aspects, the rotation shaft is non-rotatably mounted to the associated housing.

According to some aspects, the locking indicator is connected to the locking hook by means of at least one drive guide pin provided on the plate-shaped lock and release element.

According to some aspects, the at least one drive guide pin is movably arranged in an arc-shaped guide groove.

According to some aspects, the arc-shaped guide groove is formed in the associated housing.

According to some aspects, the operating handle is rotatably mounted to the associated housing by means of a connecting member, in particular a connecting shaft.

According to some aspects, the operating handle is connected to the plate-shaped lock and release element via a clutch unit arranged in the associated housing.

According to some aspects, the associated housing forms a catching notch adapted for catching a lockable arm of a door of an aircraft that performs a locking movement towards the associated housing.

According to some aspects, the door locking assembly further comprises a dampening member adapted for dampening a locking movement of a lockable arm of a door of an aircraft at the associated housing.

The present disclosure further provides an aircraft comprising a door that is equipped with a lockable arm, and a door locking assembly as described above for locking the door.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
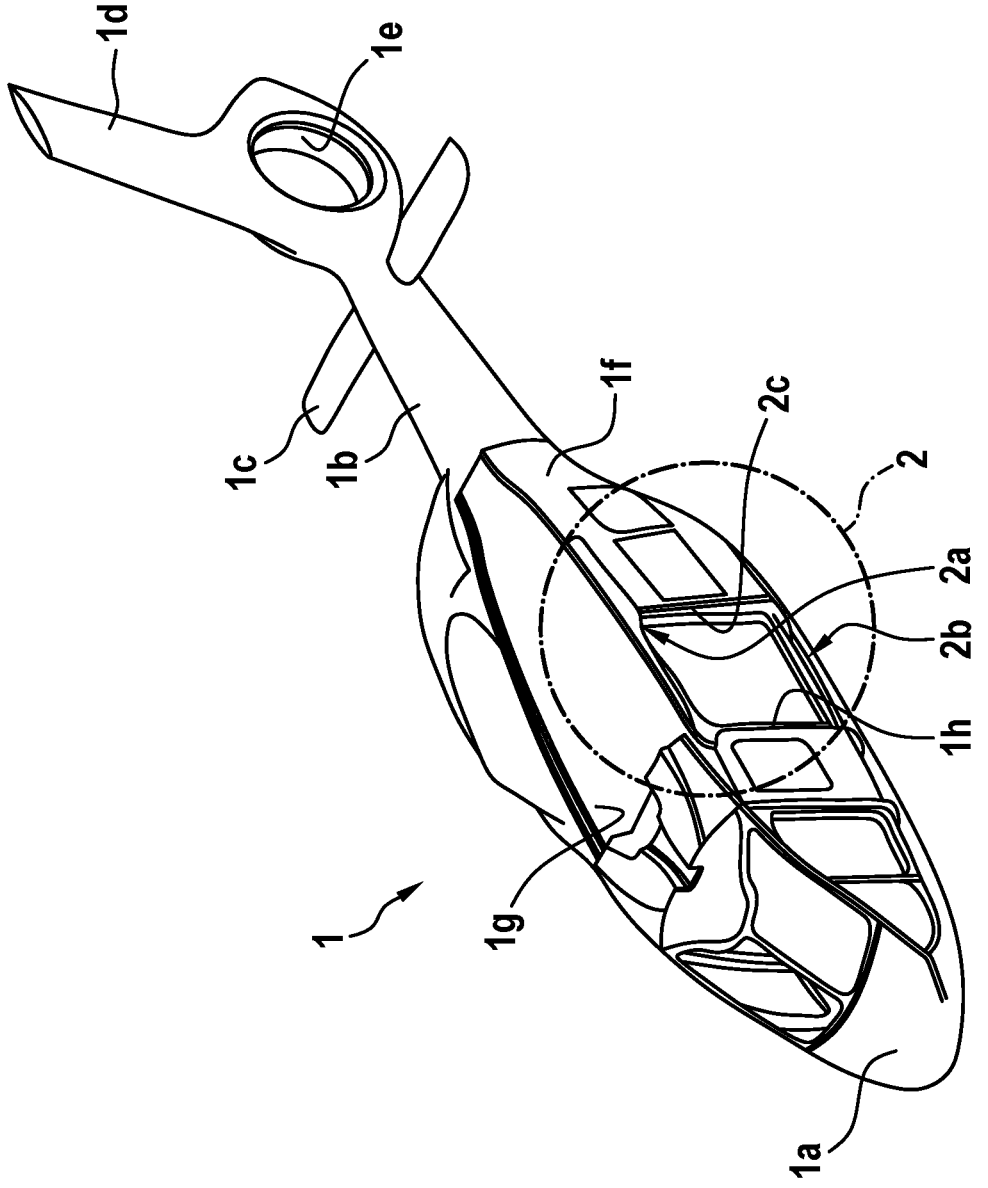
FIG. 1 shows a perspective view of a vehicle that is adapted to receive a door locking assembly according to the present disclosure.

FIG. 1 shows a vehicle 1 that is exemplarily illustrated as an aircraft, in particular as a rotary-wing aircraft and, more particularly, as a helicopter. Thus, for purposes of simplicity and clarity, the vehicle 1 is hereinafter referred to as the "rotary-wing aircraft 1". The present disclosure is, however, not limited to rotary-wing aircrafts and can likewise be applied to any other vehicle, in particular to a vehicle that is controllable in a flowing medium, such as air or water, independent of a particular configuration thereof.

Illustratively, the rotary-wing aircraft 1 comprises a fuselage 1a and a tail boom 1b, which exemplarily comprises a tail wing 1c, a fin 1d and a shroud 1e for accommodation of a suitable counter-torque device, such as a tail rotor, which is configured to provide counter-torque during operation in order to balance the rotary-wing aircraft 1 in terms of yaw. The tail boom 1b may further be provided e.g., with a horizontal stabilizer, a bumper and so on.

It should be noted that only the fuselage 1a with the tail boom 1b are shown in FIG. 1 for purposes of simplicity and clarity of the drawings. However, other conventional components, such as e.g., a main rotor and a landing gear of the rotary-wing aircraft 1, are not shown, as they are well-known to the person skilled in the art and as such not part of the present disclosure and would, thus, only unnecessarily encumber and complicate the representation.

Illustratively, the fuselage 1a comprises at least two longitudinal side walls, a portside wall 1f and a starboard side wall 1g. The fuselage 1a preferably defines at least a cockpit, a passenger cabin and/or a cargo compartment. However, for simplicity and clarity of the description, such a cockpit, passenger cabin and cargo compartment are not explained in greater detail.

By way of example, at least the portside wall 1f is provided with a sliding element region 2, wherein a sliding element arrangement (3 in FIG. 2) with at least one upper and at least one lower rail arrangement 2a, 2b can be provided. Illustratively, the upper and lower rail arrangements 2a, 2b are attached to the fuselage 1a.

More specifically, the upper and lower rail arrangements 2a, 2b are preferably adapted for slidably receiving a sliding element, in particular a sliding door (4 in FIG. 2) or a sliding window, which in turn is adapted for opening or closing an aperture 1h provided in the sliding element region 2 of the portside wall 1f, preferably sealingly. By way of example, the aperture 1h is equipped with a frame 2c.

According to one aspect of the present disclosure, the starboard side wall 1g is also provided with a sliding element region 2, wherein at least one upper and at least one lower rail arrangements 2a, 2b are attached to the fuselage 1a and wherein an aperture 1h is provided for reception of a sliding element. More specifically, the starboard side wall 1g is preferably provided with a sliding element arrangement that is preferably embodied similar to the sliding element arrangement 3 of FIG. 2.

Figure 2:
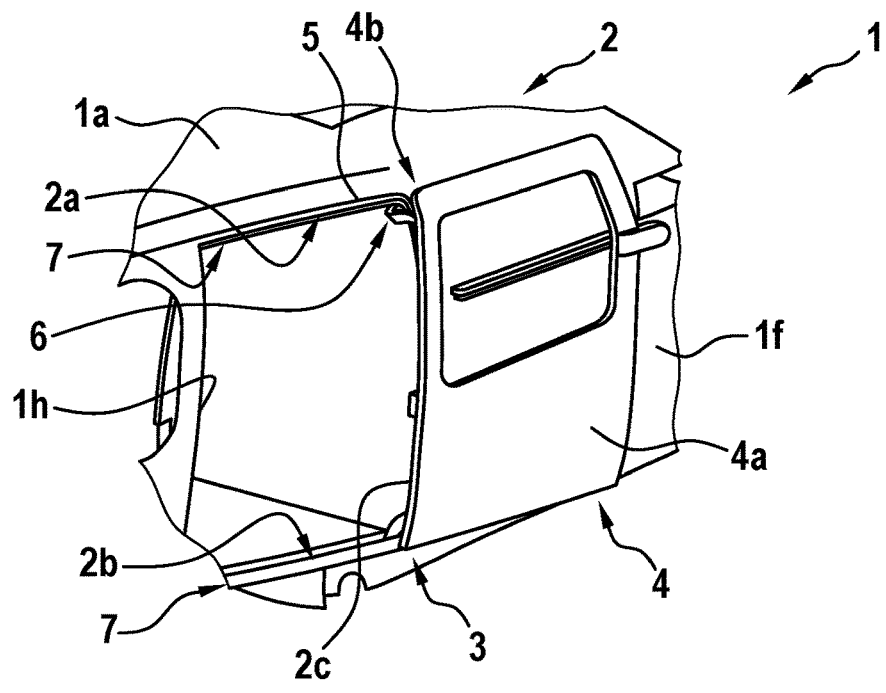
FIG. 2 shows a perspective view of a section of the vehicle of FIG. 1 with a sliding door and a door locking assembly according to the present disclosure.

FIG. 2 shows a sliding element arrangement 3, which is illustratively adapted for being mounted at the sliding element region 2 of FIG. 1 to the portside wall 1f of the fuselage 1a of the rotary-wing aircraft 1 of FIG. 1. Illustratively, the sliding element arrangement 3 is mounted to the frame 2c of the fuselage 1a, which is provided at the sliding element region 2.

The sliding element arrangement 3 preferably comprises at least one sliding element 4, in particular a sliding door or a sliding window, as well as the upper and lower rail arrangements 2a, 2b of FIG. 1, which preferably comprise associated sliding element rails 7 which are preferentially attached to the portside wall 1f of the rotary-wing aircraft 1 of FIG. 1 by means of suitable fasteners, such as screws, bolts, rivets and so on. For brevity and simplicity, the associated sliding element rails 7 are hereinafter referred to as the "rails 7".

The sliding element 4 is illustratively embodied as a sliding door that comprises at least a door leaf 4a and is, therefore, also referred to hereinafter as the "sliding door 4", for simplicity and clarity. Consequently, the frame 2c defines a sliding door frame.

The sliding door 4 is preferably slidably supported by the rails 7 such that the sliding door 4 may slide in operation along the rails 7. More specifically, the sliding door 4 is preferably at least slidable along the rails 7 by means of an opening sliding movement into an opening movement direction from a fully closed position into a fully opened position. The fully opened position is exemplarily illustrated in FIG. 2.

In the fully opened position, the sliding door 4 is preferably locked by means of an associated door locking assembly 6. The door locking assembly 6 is illustratively arranged in a door locking region 5. By way of example, the door locking region 5 is located at the upper rail arrangement 2a close to an upper edge 4b of the door leaf 4a.

Figure 3:
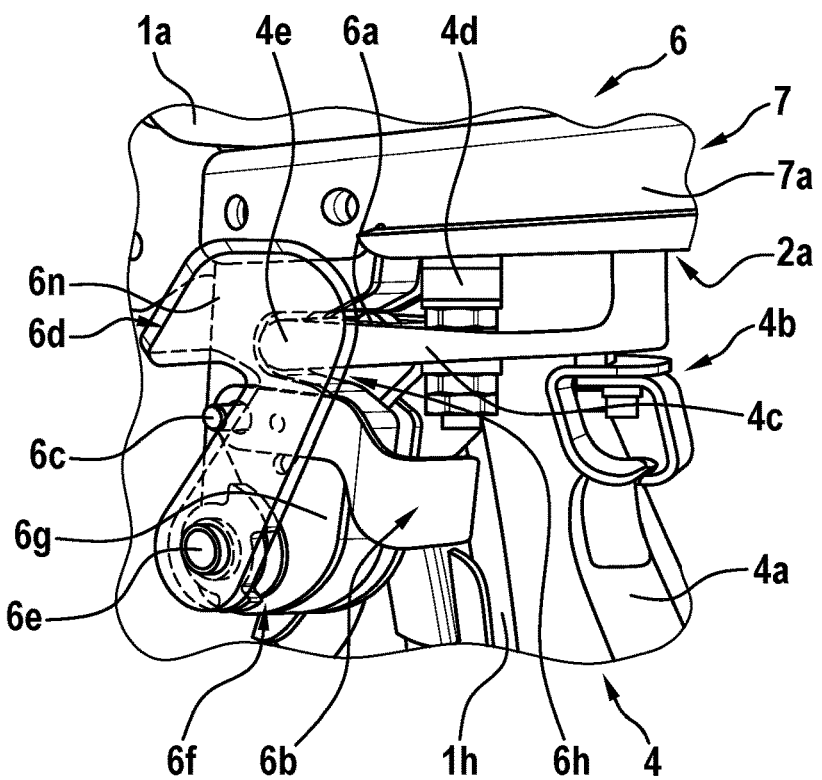
FIG. 3 shows the sliding door and the door locking assembly of FIG. 2 in locked state.

FIG. 3 shows the door locking assembly 6 of FIG. 2 which is illustratively rigidly mounted to the fuselage 1a of FIG. 1 and FIG. 2. More specifically, the door locking assembly 6 is rigidly mounted close to an upper rail 7a of the rails 7, which is part of the upper rail arrangement 2a of FIG. 2.

In FIG. 3, the door locking assembly 6 locks the sliding door 4 of FIG. 2 in its fully opened position. To enable locking of the sliding door 4 in its fully opened position, the latter is provided with a lockable arm 4e. Illustratively, the lockable are 4e is rigidly mounted to the sliding door 4 via a locking lug member 4c. For instance, the locking lug member 4c may be rigidly mounted to the door leaf 4a, e.g., at the upper edge 4b of the door leaf 4a, or to a roller carriage provided at the upper edge 4b. Furthermore, the locking lug member 4c may be provided with a guide member 4d for implementing a failsafe function of the sliding door 4.

Illustratively, the lockable arm 4e is locked by the door locking assembly 6. The door locking assembly 6 comprises a locking hook 6a that is adapted for blocking, in an illustrated locking position, the lockable arm 4e of the sliding door 4. By way of example, the locking hook 6a extends in the illustrated locking position into a respective lug formed by the locking lug member 4c.

Figure 4:
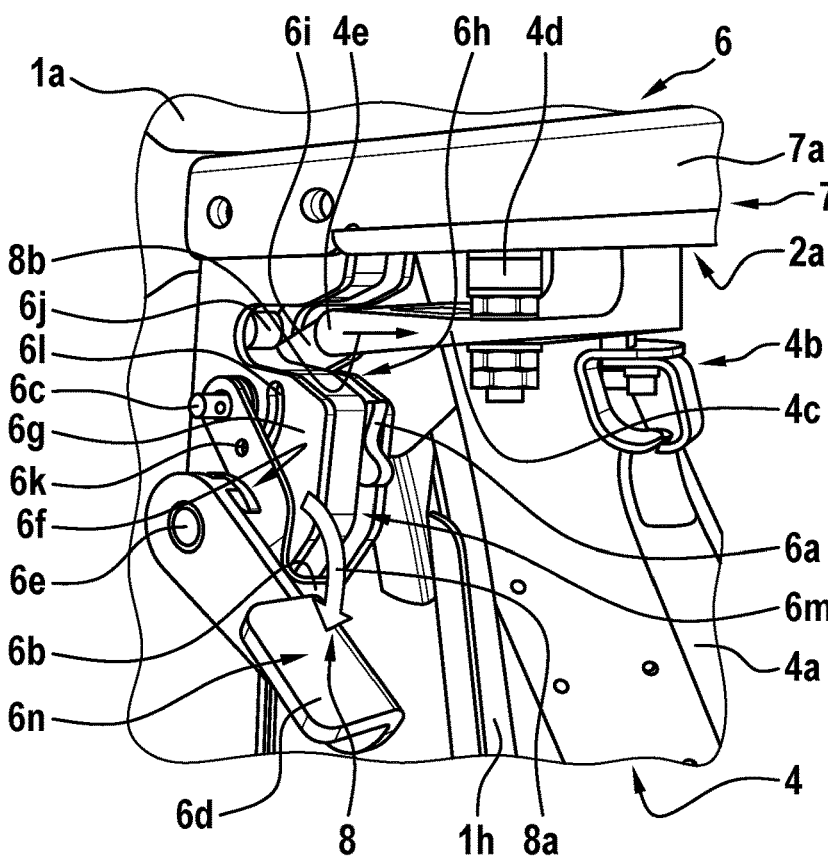
FIG. 4 shows the sliding door and the door locking assembly of FIG. 2 and FIG. 3 during unlocking.
Figure 5:
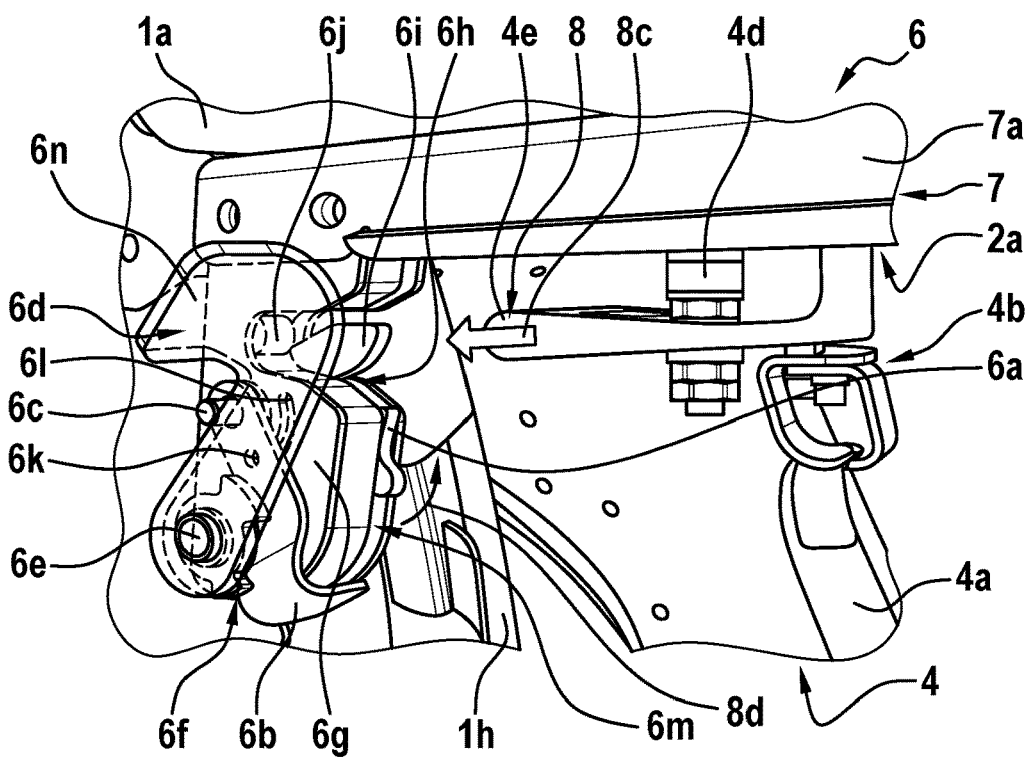
FIG. 5 shows the sliding door and the door locking assembly of FIG. 2 to FIG. 4 in a locking process.

Furthermore, the door locking assembly 6 comprises a release lever (6i in FIG. 4 to FIG. 6) connected to the locking hook 6a for moving the locking hook 6a from a releasing position illustrated in FIG. 4 and FIG. 5 into the locking position in response to being actuated by the lockable arm 4e. The release lever (6i in FIG. 4 to FIG. 6) is connected to an operating handle 6d which is rotatable for moving the locking hook 6a from the locking position to the releasing position illustrated in FIG. 4 and FIG. 5. The operating handle 6d may comprise a grip plate 6n to enable an easy and comfortable operating of the operating handle 6d.

Moreover, the locking hook 6a is connected to a locking indicator 6b provided for indicating positioning of the locking hook 6a in one of the locking position or the releasing position. In FIG. 3, the locking indicator 6b illustratively indicates positioning of the locking hook 6a in the locking position.

Preferably, the locking hook 6a is rotatably mounted to an associated housing 6g via a rotation shaft 6c. Likewise, the locking indicator 6b is preferably rotatably mounted to the associated housing 6g via the rotation shaft 6c. The rotation shaft 6c, in turn, is preferably non-rotatably mounted to the associate housing 6g. The associated housing 6g may be rigidly attached to the fuselage 1a.

Furthermore, the operating handle 6d is preferably rotatably mounted to the associated housing 6g by means of a connecting member 6e, in particular a connecting shaft. More specifically, the operating handle 6d may be connected to the release lever (6i in FIG. 4 to FIG. 6) via a clutch unit 6f arranged in the associated housing 6g. A suitable clutch unit that may be used for implementing the clutch unit 6f is well-known to the person skilled in the art and, as such, not part of the present disclosure. Accordingly, a detailed description of the clutch unit 6f is omitted, for brevity and conciseness.

Illustratively, the associated housing 6g forms a catching notch 6h adapted for catching the lockable arm 4e when the latter performs a locking movement toward the associated housing 6g. The catching notch 6h is preferably at least approximately V-shaped in order to guarantee a reliable entering of the lockable arm 4e into the catching notch 6h during the locking movement.

FIG. 4 shows the sliding door 4 with the lockable arm 4e and the locking lug member 4c of FIG. 3, as well as the door locking assembly 6 of FIG. 3 which is illustratively rigidly mounted as illustrated in FIG. 3 to the fuselage 1a close to the upper rail 7a of the rails 7. As described above at FIG. 3, the door locking assembly 6 illustratively comprises the locking hook 6a, the locking indicator 6b, the rotation shaft 6c, the operating handle 6d with the grip plate 6n, the connecting member 6e, the associated housing 6g, and the catching notch 6h.

The door locking assembly 6 further comprises a release lever 6i. Preferably, the release lever 6i is rigidly attached to, or integrally formed with, the locking hook 6a.

Furthermore, the door locking assembly 6 may comprise a dampening member 6j which is illustratively accommodated in the catching notch 6h formed in the associated housing 6g. The dampening member 6j may be embodied as an absorption bumper, in particular an elastomeric bumper. The dampening member 6j may be provided to prevent damage and wearing due to vibration, but it may also be suitable for absorption of energy, as described below at FIG. 5.

More specifically, FIG. 4 shows an illustrative unlocking process performed by means of the door locking assembly 6. The illustrative unlocking process implies movements of different components in different movement directions illustrated with arrows 8.

The illustrative unlocking process starts with a rotation of the operating handle 6d from an initial standby position shown in FIG. 3 in a rotation direction 8a illustrated in FIG. 4, whereby the operating handle 6d is rotated about the connecting member 6e. For instance, an operator pushes the grip plate 6n of the operating handle 6d in the rotation direction 8a.

Via the rotation of the operating handle 6d, the locking hook 6a is rotated in the rotation direction 8a about the rotation shaft 6c from the locking position illustrated in FIG. 3 to a releasing position as illustrated. Simultaneously, the release lever 6i is rotated in the rotation direction 8a about the rotation shaft 6c and pushes the lockable arm 4e in an ejection direction 8b out of the catching notch 6h. By way of example, the locking hook 6a and the release lever 6i are rotated in a guide groove 6m embodied in the associated housing 6g.

The rotation of the locking hook 6a and the release lever 6i in the rotation direction 8a about the rotation shaft 6c causes rotation of the locking indicator 6b in the rotation direction 8a about the rotation shaft 6c. This rotation is caused via a drive guide pin 6k that is attached to, or integrally formed with, the locking hook 6a and/or the release lever 6i and movably arranged in a guide groove 6l, such that the drive guide pin 6k entrains the locking indicator 6b. The guide groove 6l is illustratively arc-shaped and formed in the associated housing 6g.

At the end of the illustrative unlocking process the locking indicator 6b indicates positioning of the locking hook 6a in the releasing position and, thus, indicates that the sliding door 4 is unlocked. Furthermore, the operator releases the grip plate 6n of the operating handle 6d preferably at the end of the illustrative unlocking process. This leads to a rotation of the operating handle 6d in a rotation direction opposed to the rotation direction 8a such that the operating handle 6d is moved back from its illustrated end position to its initial standby position shown in FIG. 3. For instance, the operating handle 6d may be biased by a suitable spring element.

FIG. 5 shows the sliding door 4 with the lockable arm 4e and the locking lug member 4c of FIG. 4, as well as the door locking assembly 6 of FIG. 3 and FIG. 4, which is illustratively rigidly mounted as illustrated in FIG. 4 to the fuselage 1a close to the upper rail 7a of the rails 7. As described above at FIG. 4, the door locking assembly 6 illustratively comprises the locking hook 6a, the locking indicator 6b, the rotation shaft 6c, the operating handle 6d with the grip plate 6n, the connecting member 6e, the associated housing 6g with the guide grooves 6l, 6m, the catching notch 6h, the release lever 6i, and the dampening member 6j.

More specifically, FIG. 5 shows an illustrative locking process performed by means of the door locking assembly 6. The illustrative locking process implies movements of different components in different movement directions illustrated with the arrows 8.

The illustrative locking process starts with movement of the sliding door 4 in a locking movement direction 8c toward the door locking assembly 6, i.e., illustratively in a locking movement direction 8c. Thus, the lockable arm 4e is entrained to a locking movement in the locking movement direction 8c.

Upon reaching the door locking assembly 6, the lockable arm 4e is caught in the catching notch 6h, where the lockable arm 4e abuts against the release lever 6i. By means of a further movement of the lockable arm 4e in the locking movement direction 8c, rotation of the release lever 6i and, thus, of the locking hook 6a in a rotation direction 8d about the rotation shaft 6c from the illustrated releasing position to the locking position illustrated in FIG. 3 is caused. In other words, the locking hook 6a is rotated into the locking position in response to the release lever 6i being actuated by the lockable arm 4e.

The rotation of the locking hook 6a and the release lever 6i in the rotation direction 8d about the rotation shaft 6c causes rotation of the locking indicator 6b in the rotation direction 8*d* about the rotation shaft 6*c*. This rotation is caused via the drive guide pin 6*k* which entrains the locking indicator 6*b*.

At the end of its locking movement in the locking movement direction 8*c*, the lockable arm 4*e* abuts against the dampening member 6*j*. The dampening member 6*j* is preferably adapted for dampening the locking movement of the lockable arm 4*e* at the associated housing 6*g*.

Accordingly, at the end of the illustrative locking process the locking indicator 6*b* indicates positioning of the locking hook 6*a* in the locking position according to FIG. 3 and, thus, indicates that the sliding door 4 is locked.

It should be noted that the entire illustrative locking process is merely performed by sliding the sliding door 4 along the rails 7 into its fully opened position. Thereby, the door locking assembly 6 is activated and locks the sliding door 4 in its fully opened position without the operator being required to act manually on the door locking assembly 6. Accordingly, the operating handle 6*d* remains in its initial standby position shown in FIG. 4 during the entire illustrative locking process.

Figure 6:
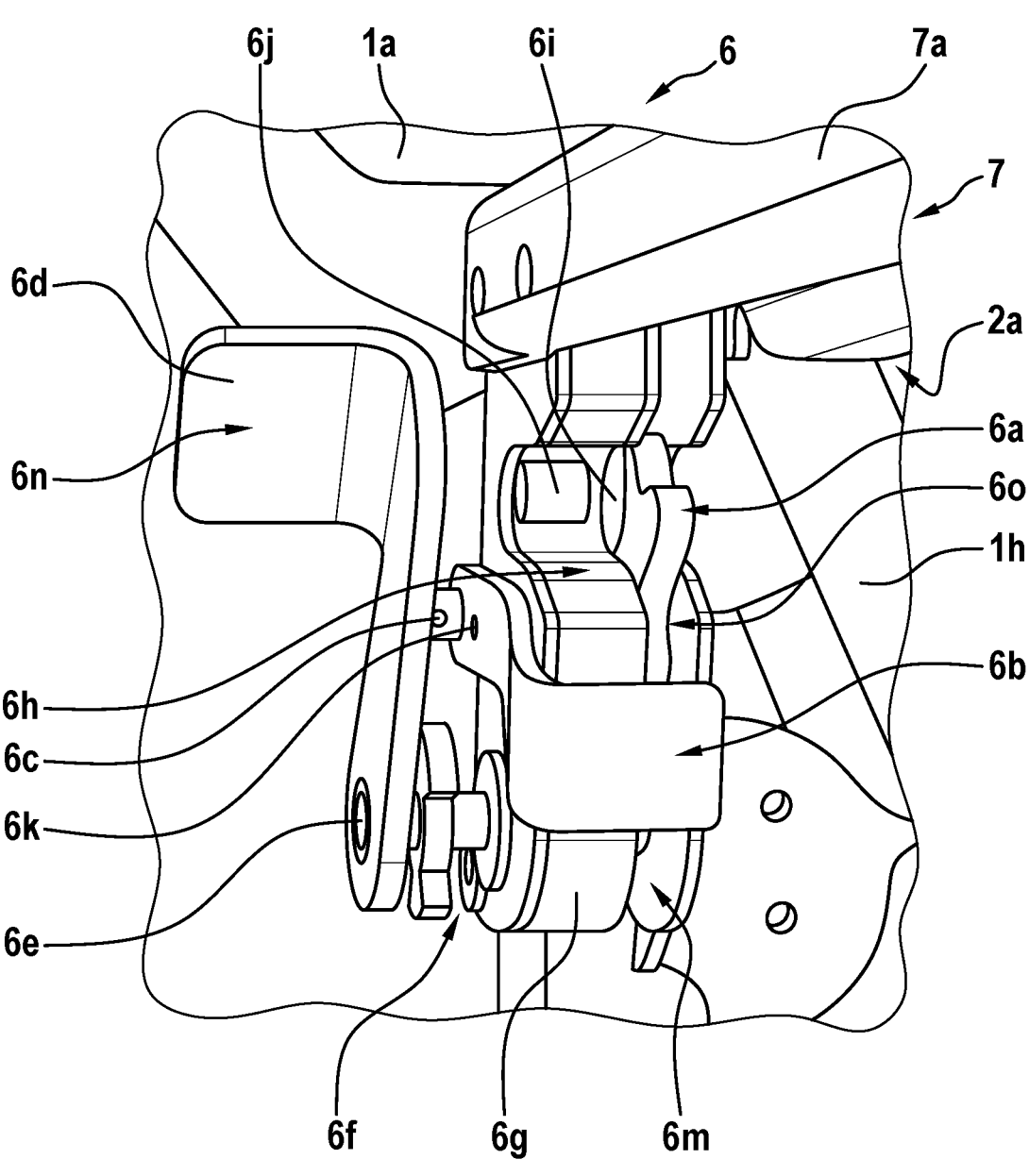
FIG. 6 shows the door locking assembly of FIG. 2 to FIG. 5.

FIG. 6 shows the sliding door 4 with the lockable arm 4*e* and the locking lug member 4*c* of FIG. 4, as well as the door locking assembly 6 of FIG. 3 to FIG. 5, which is illustratively rigidly mounted as illustrated in FIG. 4 to the fuselage 1*a* close to the upper rail 7*a* of the rails 7. As described above at FIG. 4, the door locking assembly 6 illustratively comprises the locking hook 6*a*, the locking indicator 6*b*, the rotation shaft 6*c*, the operating handle 6*d* with the grip plate 6*n*, the connecting member 6*e*, the associated housing 6*g* with the guide grooves 6*l*, 6*m*, the catching notch 6*h*, the release lever 6*i*, and the dampening member 6*j*.

Preferably, the locking hook 6*a* and the release lever 6*i* form a plate-shaped lock and release element 6*o*. More specifically, the locking hook 6*a* is either rigidly attached to or, preferentially, integrally formed with the release lever 6*i* to form the plate-shaped lock and release element 6*o*.

The plate-shaped lock and release element 6*o* is preferably rotatably mounted to the associated housing 6*g*. More specifically, the plate-shaped lock and release element 6*o* is rotatably mounted in the guide groove 6*m* of the associated housing 6*g* to the associated housing 6*g* via the rotation shaft 6*c*. Accordingly, the locking hook 6*a* and the release lever 6*i* are both rotatable about the rotation shaft 6*c*, as described above.

Preferably, the plate-shaped lock and release element 6*o* is provided with the drive guide pin 6*k*, which connects the plate-shaped lock and release element 6*o* to the locking indicator 6*b* and, thus, to the locking hook 6*a* as described above. Furthermore, the plate-shaped lock and release element 6*o* is preferably connected via the clutch unit 6*f* arranged in the associated housing 6*g* to the operating handle 6*d*. The clutch unit 6*f* may comprise the connecting member 6*e*.

It should be noted that modifications to the above described embodiments are within the common knowledge of the person skilled in the art and, thus, also considered as being part of the present disclosure. For instance, in FIG. 3 to FIG. 6 the sliding door 4 is provided with the lockable arm 4*e* and the door locking assembly 6 is rigidly mounted to the fuselage 1*a*. Alternatively, the sliding door 4 may be provided with the door locking assembly 6 and the lockable arm 4*e* may be rigidly mounted to the fuselage 1*a*, and so on.

REFERENCE LIST 1 rotary-wing aircraft
1*a* fuselage
1*b* tail boom
1*c* tail wing
1*d* fin
1*e* tail rotor shroud
1*f* portside wall
1*g* starboard side wall
1*h* side wall aperture
2 sliding door region
2*a* upper rail arrangement
2*b* lower rail arrangement
2*c* sliding door frame
3 sliding door arrangement
4 portside sliding door
4*a* door leaf
4*b* door leaf upper edge
4*c* door locking lug member
4*d* door guiding member
4*e* lockable arm
5 door locking region
6 door locking assembly
6*a* locking hook
6*b* locking indicator
6*c* rotation shaft
6*d* operating handle
6*e* connecting member
6*f* clutch unit
6*g* clutch unit housing
6*h* catching notch
6*i* release lever
6*j* dampening member
6*k* drive guide pin
6*l*, 6*m* guide grooves
6*n* grip plate
7 sliding door rails
7*a* upper guide rail
8 movement/rotation directions
8*a* unlocking rotation direction
8*b* ejection movement direction
8*c* locking movement direction
8*d* locking rotation direction
What is claimed is:

1. A door locking assembly for locking a door of an aircraft, the door locking assembly comprising:
a locking hook that is movable between a locking position and a releasing position, the locking hook when in the locking position blocking a lockable arm of the door of the aircraft;
a release lever connected to the locking hook for moving the locking hook from the releasing position into the locking position in response to being actuated by the lockable arm of the door of the aircraft;
an operating handle connected at least to the release lever and rotatable for moving the locking hook from the locking position to the releasing position; and
a visual locking indicator connected to the locking hook and movable for visually indicating a current positioning of the locking hook in one of the locking position or the releasing position, such that the visual locking indicator is moveable by movement of the locking hook and the release lever.

2. The door locking assembly of claim 1, wherein the locking hook is rigidly attached to, or integrally formed with, the release lever.

3. The door locking assembly of claim 1, wherein the locking hook and the release lever form a plate-shaped lock and release element.

4. The door locking assembly of claim 3, wherein the plate-shaped lock and release element is rotatably mounted to an associated housing.

5. The door locking assembly of claim 4, wherein the plate-shaped lock and release element is rotatably mounted to the associated housing via a rotation shaft.

6. The door locking assembly of claim 5, wherein the visual locking indicator is rotatably mounted to the associated housing via the rotation shaft.

7. The door locking assembly of claim 5, wherein the rotation shaft is non-rotatably mounted to the associated housing.

8. The door locking assembly of claim 3, wherein the visual locking indicator is connected to the locking hook by means of at least one drive guide pin provided on the plate-shaped lock and release element.

9. The door locking assembly of claim 8, wherein the at least one drive guide pin is movably arranged in an arc-shaped guide groove.

10. The door locking assembly of claim 9, wherein the arc-shaped guide groove is formed in the associated housing.

11. The door locking assembly of claim 4, wherein the operating handle is rotatably mounted to the associated housing by means of a connecting member, in particular a connecting shaft.

12. The door locking assembly of claim 4, wherein the operating handle is connected to the plate-shaped lock and release element via a clutch unit arranged in the associated housing.

13. The door locking assembly of claim 4, wherein the associated housing forms a catching notch adapted for catching a lockable arm of a door of an aircraft that performs a locking movement towards the associated housing.

14. The door locking assembly of claim 4, further comprising a dampening member adapted for dampening a locking movement of a lockable arm of a door of an aircraft at the associated housing.

15. An aircraft comprising a door that is equipped with a lockable arm, and a door locking assembly for locking the door according to claim 1.

16. The door locking assembly of claim 5, wherein the visual locking indicator is moveable from a first position to a second position, the first position being the locking indicating position and the second position being the releasing indicating position, the first position being spaced from the second position.

17. The door locking assembly of claim 1, wherein the visual locking indicator is rotatable from a first position to a second position, the first position being the locking indicating position and the second position being the releasing indicating position, the first position being angularly spaced from the second position.

18. A door locking assembly for locking a door of an aircraft, the door locking assembly comprising:

a locking hook that is movable between a locked position and a released position, the locking hook when in the locked position blocking a lockable arm of the door of the aircraft in a locked position;

a release lever connected to the locking hook for moving the locking hook from the released position into the locked position in response to actuation by the lockable arm of the door of the aircraft;

an operating handle connected to the release lever and rotatable to move the locking hook from the locked position to the released position; and a visual lock indicator connected to the locking hook and rotatably moveable between a first position and a second position to visually indicate a current positioning of the locking hook in the locked position when the visual lock indicator is in the first position or the released position when the visual lock indicator is in the second position, such that the visual locking indicator is moveable by movement of the locking hook and the release lever.

19. A door locking assembly for locking a door of an aircraft, the door locking assembly comprising:

a locking hook that is movable between a locked position and a released position, the locking hook in the locked position blocking a lockable arm of a door of an aircraft;

a release lever connected to the locking hook for moving the locking hook from releasing the released position into the locked position in response to being actuated by the lockable arm of the door of the aircraft;

an operating handle connected at least to the release lever and rotatable for moving the locking hook from the locking position to the releasing position; and a visual locking indicator connected to the locking hook, the locking indicator movable to visually indicate in a first position positioning of the locking hook in the locked position or in a second position positioning of the locking hook in the released position, such that the visual locking indicator is moveable by movement of the locking hook and the release lever.

20. The door locking assembly of claim 19, wherein the visual locking indicator is rotatable from a first position to a second position, the first position being the locking indicating position and the second position being the releasing indicating position, the first position being angularly spaced from the second position.

* * * * *